US011453309B2

(12) United States Patent
Huff et al.

(10) Patent No.: US 11,453,309 B2
(45) Date of Patent: Sep. 27, 2022

(54) ELECTRIC POWER DISTRIBUTION SYSTEM AND METHOD FOR ELECTRIC MINING MACHINE

(71) Applicant: Artisan Vehicle Systems, Inc., Camarillo, CA (US)

(72) Inventors: Brian R Huff, Newbury Park, CA (US); Kyle Hickey, Moorpark, CA (US); Christopher Vochoska, Simi Valley, CA (US)

(73) Assignee: Artisan Vehicle Systems, Inc., Camarillo, CA (US)

( * ) Notice: Subject to any disclaimer, the term of this patent is extended or adjusted under 35 U.S.C. 154(b) by 671 days.

(21) Appl. No.: 16/434,400

(22) Filed: Jun. 7, 2019

(65) Prior Publication Data

US 2020/0156500 A1 May 21, 2020

Related U.S. Application Data

(60) Provisional application No. 62/727,930, filed on Sep. 6, 2018.

(51) Int. Cl.
*B60L 58/00* (2019.01)
*B60L 58/13* (2019.01)
(Continued)

(52) U.S. Cl.
CPC ............... *B60L 58/13* (2019.02); *B60K 1/04* (2013.01); *B60L 7/10* (2013.01); *B60L 53/53* (2019.02); *B60K 2001/001* (2013.01)

(58) Field of Classification Search
CPC .. B60L 58/13; B60L 58/22; B60L 7/10; B60L 53/53; B60L 2220/42; B60K 1/04; B60K 2001/001; Y02T 10/70
See application file for complete search history.

(56) References Cited

U.S. PATENT DOCUMENTS 9,960,396 B2 5/2018 Huff et al.
9,994,117 B2 * 6/2018 Huff .................... B60K 1/00
(Continued)

FOREIGN PATENT DOCUMENTS

CN 101309810 A * 11/2008 ............... B60K 6/26
CN 204283481 U * 4/2015
(Continued)

OTHER PUBLICATIONS

International Search Report and Written Opinion dated Dec. 23, 2019 for PCT Application No. PCT/US2019/049911.
(Continued)

*Primary Examiner* — Naum Levin
(74) *Attorney, Agent, or Firm* — Plumsea Law Group, LLC

(57) ABSTRACT

An electric power distribution system and method for an electric mining machine is described. In one embodiment, a method for electric power distribution includes receiving information associated with a state of charge of a first battery pack that supplies electric power to a front electric motor configured to drive a front axle of an electric mining machine. The method also includes receiving information associated with a state of charge of a second battery pack that supplies electric power to a rear electric motor configured to drive a rear axle of the electric mining machine. The method includes comparing the state of charge of the first battery pack and the second battery pack and, upon determining that the state of charge of the second battery pack is greater than the state of charge of the first battery pack, increasing electric power to the rear electric motor of the electric mining machine.

20 Claims, 8 Drawing Sheets

(51) Int. Cl.
  *B60L 53/53*  (2019.01)
  *B60K 1/04*  (2019.01)
  *B60L 7/10*  (2006.01)
  *B60K 1/00*  (2006.01)

(56) References Cited

U.S. PATENT DOCUMENTS

| | | | |
|---|---|---|---|
| 10,063,069 B1 | 8/2018 | Huff et al. | |
| 10,615,465 B2* | 4/2020 | Huff | H01M 10/441 |
| 10,647,324 B2* | 5/2020 | Crain | B60W 30/18 |
| 11,114,866 B2* | 9/2021 | Straßner | B60L 53/11 |
| 2011/0089897 A1 | 4/2011 | Zhang et al. | |
| 2014/0184159 A1 | 7/2014 | Kachi | |
| 2014/0225622 A1 | 8/2014 | Kudo et al. | |
| 2017/0005371 A1* | 1/2017 | Chidester | H01M 10/613 |
| 2017/0352203 A1 | 12/2017 | Jansson | |
| 2018/0086343 A1* | 3/2018 | Crain | B60W 30/18127 |
| 2018/0186612 A1* | 7/2018 | De Jong | B66F 3/46 |
| 2018/0334782 A1 | 11/2018 | Huff et al. | |
| 2019/0263241 A1 | 8/2019 | Huff et al. | |
| 2019/0263242 A1 | 8/2019 | Huff et al. | |
| 2019/0263269 A1 | 8/2019 | Huff et al. | |
| 2019/0263270 A1 | 8/2019 | Huff et al. | |
| 2021/0197679 A1* | 7/2021 | Kouvo | H02J 1/08 |
| 2021/0391622 A1* | 12/2021 | Froelich | H02P 5/695 |

FOREIGN PATENT DOCUMENTS

| | | | | |
|---|---|---|---|---|
| CN | 104937175 B | * | 3/2017 | B60L 1/003 |
| CN | 206856876 U | * | 1/2018 | |
| CN | 108001240 A | * | 5/2018 | B60L 7/10 |
| CN | 207809027 U | * | 9/2018 | |
| CN | 108749785 B | * | 5/2021 | B60K 1/04 |
| EP | 1591320 B1 | * | 5/2009 | B60R 16/03 |
| EP | 3323664 A1 | * | 5/2018 | B60L 15/20 |
| KR | 20170051059 A | | 5/2017 | |
| WO | WO-2011109050 A2 | * | 9/2011 | B60L 1/20 |

OTHER PUBLICATIONS

International Preliminary Examination Report dated Mar. 18, 2021 for PCT Application No. PCT/US2019/049911.

* cited by examiner

ELECTRIC POWER DISTRIBUTION SYSTEM AND METHOD FOR ELECTRIC MINING MACHINE

CROSS-REFERENCE TO RELATED APPLICATION(S)

This application claims priority to provisional patent application No. 62/727,930, filed Sep. 6, 2018, and entitled "Zero Emission Electric Mining Vehicle," the entire disclosure of which is incorporated herein by reference. In addition, this application is related to commonly owned U.S. Patent Application Publication No. 2020/0157769, entitled "Electric Load-Haul-Dump Mining Machine"; U.S. Patent Application Publication No. 2020/0384869, entitled "Battery Load Mechanism for Electric LHD Mining Machine"; and U.S. Pat. No. 11,305,746, entitled "Separable Tow Hook Brake Release System" all filed concurrently herewith on Jun. 7, 2019, and each of which is incorporated herein by reference in its entirety.

BACKGROUND OF THE INVENTION

1. Field of the Invention

The present disclosure relates broadly to electric machines and vehicles, and more specifically to electric machines and vehicles used in subsurface mines.

2. Description of Related Art

An overview of a sub-surface mine environment and general description of electric vehicles for mining is described in U.S. Pat. No. 9,994,117, issued on Jun. 12, 2018, titled "System And Method For Providing Power To A Mining Operation," the entire contents of which are hereby incorporated by reference. The present disclosure relates heavy duty electric powered machines or vehicles that may operate in a continuous work environment such as a sub-surface mine. The battery packs employed in electric mining machines are heavy-duty, high powered battery packs which are comprised of multiple battery modules contained in a pack housing. Each module is comprised of multiple cells. The modules are equipped with an array of operational sensors and are provided with electronic components to provide data from the sensors to a separate maintenance network. Sensors can include temperature sensors, timing devices, charge level detection devices, and other monitoring devices which can be employed to provide an operations center with accurate, real-time data regarding the performance of the module and its performance history. Details of exemplary battery packs and battery management systems and the associated data generation and monitoring can be found in commonly owned U.S. Pat. No. 9,960,396 issued on May 1, 2018, titled "Module Backbone System;" and U.S. Pat. No. 10,063,069 issued on Aug. 28, 2018, titled "Module Maintenance System;" the entire contents of which are hereby incorporated by reference.

Co-pending and commonly owned U.S. application Ser. No. 15/980,314 filed May 15, 2018, titled "Electrically Powered Mining Vehicle;" U.S. application Ser. No. 15/908,794 filed Feb. 28, 2018, titled "Electric Haul Truck;" U.S. application Ser. No. 15/908,799 filed Feb. 28, 2018, titled "Mounting and Dismounting System for a Battery Assembly;" U.S. application Ser. No. 15/908,802 filed Feb. 28, 2018, titled "Method and System for Mounting and Dismounting Batteries in a Vehicle;" and U.S. application Ser. No. 15/908,804 filed Feb. 28, 2018, titled "Alignment and Locking Mechanism for Removable Battery Assembly" contain descriptions electric mining machines, the batteries, and the sub-surface mining environment, the entire contents of which are hereby incorporated by reference.

SUMMARY

An electric power distribution system and method for an electric mining machine are provided according to the techniques described herein.

In one aspect, a method for electric power distribution in an electric mining machine is provided. The method includes receiving information associated with a state of charge of a first battery pack. The first battery pack supplies electric power to a front electric motor configured to drive a front axle of an electric mining machine. The method also includes receiving information associated with a state of charge of a second battery pack. The second battery pack supplies electric power to a rear electric motor configured to drive a rear axle of the electric mining machine. The method includes comparing the state of charge of the first battery pack to the state of charge of the second battery pack and, upon determining that the state of charge of the second battery pack is greater than the state of charge of the first battery pack, increasing electric power to the rear electric motor of the electric mining machine.

In another aspect, a power control system in an electric mining machine is provided for providing electric power distribution. The power control system includes a power system controller in communication with at least a first battery pack and a second battery pack of an electric mining machine. The first battery pack is configured to supply electric power to a front electric motor to drive a front axle of the electric mining machine. The second battery pack is configured to supply electric power to a rear electric motor to drive a rear axle of the electric mining machine. The power system controller is configured to compare a state of charge of the first battery pack to a state of charge of the second battery pack and, upon determining that the state of charge of the second battery pack is greater than the state of charge of the first battery pack, increase electric power to the rear electric motor of the electric mining machine In another aspect, an electric mining machine is provided. The electric mining machine includes a front electric motor configured to drive a front axle of the electric mining machine. The electric mining machine also includes a rear electric motor configured to drive a rear axle of the electric mining machine. A first battery pack is configured to supply electric power to the front electric motor and a second battery pack is configured to supply electric power to the rear electric motor. A power system controller is in communication with at least the first battery pack, the front electric motor, the second battery pack, and the rear electric motor. The power system controller is configured to compare a state of charge of the first battery pack to a state of charge of the second battery pack and, upon determining that the state of charge of the second battery pack is greater than the state of charge of the first battery pack, increase electric power to the rear electric motor of the electric mining machine.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Electric mining machines are generally powered by onboard battery packs. The machines can be load-haul-dump (LHD) machines, scalers, graders, scoops, rock breakers, cutters, haulers or a combination. In general, electric mining machines are heavy duty vehicles engineered for the challenging subsurface environments and limited spaces powered by an onboard battery or other power source. The machines generally include a tool end, heavy-duty wheels and tires, an operator area, controls, and may include a removable power source mounted onboard the machine.

This disclosure is directed to an electric power distribution system and method for an electric mining machine having two main battery packs that each supply electric power to individual electric motors on front and rear axles of the electric mining machine. According to the techniques described herein, the electric power distribution system and method distributes power between the individual electric motors in order to equalize the amount of charge of remaining between the two main battery packs.

Figure 1:
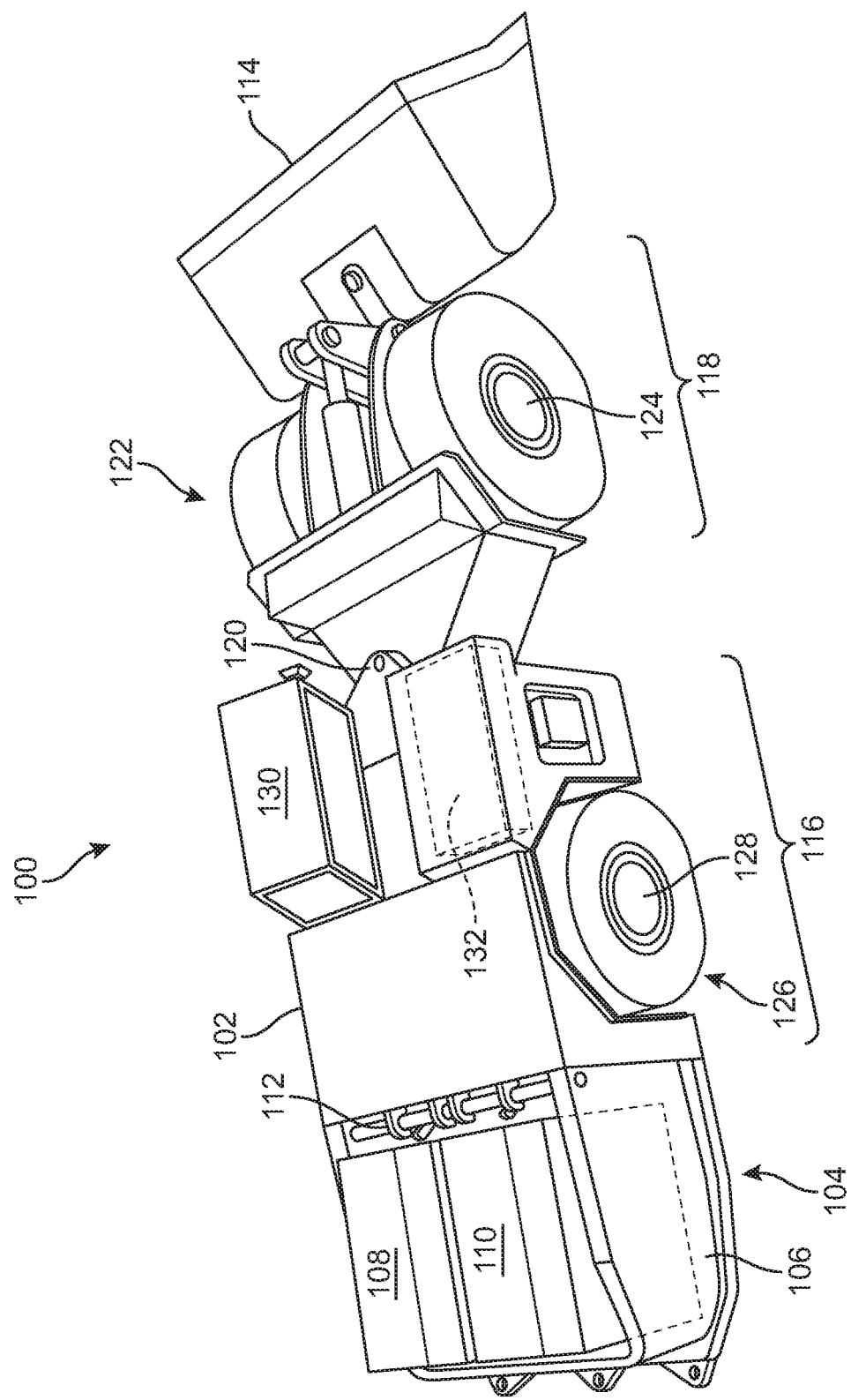
FIG. 1 is an isometric view of an example embodiment of an electric mining machine.

FIG. 1 illustrates an example embodiment of an electric mining machine 100. In one embodiment, electric mining machine 100 is a load-haul-dump (LHD) machine with a hauling capacity of approximately 10 metric tons. In other embodiments, however, the techniques of the present embodiments for electric power distribution may be applied to any type of electric mining machine or electric vehicle.

As shown in FIG. 1, in this embodiment, electric mining machine 100 includes a chassis 102 (or frame) that comprises the main body of electric mining machine 100. Chassis 102 is configured to engage with a removable power source 104 that provides electrical power to electric mining machine 100. Removable power source 104 includes a battery frame 106 that holds battery packs that provide the electrical power to electric mining machine 100. In this embodiment, removable power source 104 includes two battery packs, including a first battery pack 108 and a second battery pack 110. Each battery pack is a separate, self-contained battery pack that is configured to supply electric power to individual electric motors, as will be described below.

In an example embodiment, each of first battery pack 108 and second battery pack 110 may be a heavy-duty, high powered battery pack which is comprised of multiple battery modules contained in a pack housing. Each battery module (or module) is comprised of multiple battery cells (or cells). The modules are also equipped with an array of operational sensors and are provided with electronic components to provide data from the sensors to a separate maintenance network. Suitable battery modules and associated sensors and components are described in commonly owned U.S. Pat. Nos. 9,960,396 and 10,063,069, incorporated by reference above.

Removable power source 104 is removably attached to electric mining machine 100. As used herein, the term "removably attached" refers to two components that are joined together but that can be separated without destroying one or the other component. That is, the components can be non-destructively detached from one another. Exemplary modalities of "removable attachment" include connections made using removeable fasteners, latches, locks, hooks, magnetic connections as well as other kinds of connections.

In this embodiment, removable power source 104 is removably attached to chassis 102 at the rear of electric mining machine 100. For example, as shown in FIG. 1, an attachment mechanism 112 engages a portion of battery frame 106 of removable power source 104 using a plurality of hooks. It should be understood that attachment mechanism 112 shown in FIG. 1 is merely exemplary and other types of attachment mechanisms may be used to attach removable power source 104 to electric mining machine 100. Additionally, in other embodiments, the attachment location of removable power source 104 on electric mining machine 100 may also be different.

In an example embodiment, electric mining machine 100 is an LHD and includes a bucket 114 at the front of electric mining machine 100. In other embodiments, however, electric mining machine may be any type of electric mining machine or electric vehicle. In these embodiments, the electric mining machine may be equipped with different mechanisms depending on its function. That is, bucket 114 is optional and is not required to implement the techniques of the example embodiments.

In some embodiments, chassis 102 comprising the main body of electric mining machine 100 may include a first body portion 116 and a second body portion 118. First body portion 116 may be a rearward portion of electric mining machine 100. Second body portion 118 may be a frontward portion of electric mining machine 100. In some embodiments, a mechanical linkage 120 connects first body portion 116 and second body portion 118 so that the two portions can move relative to one another (e.g., swivel or pivot).

In an example embodiment, electric mining machine 100 includes a propulsion system comprising one or more electric motors that are powered by one or more batteries. In some embodiments, electric mining machine 100 may include at least two electric motors for powering each set of wheels. For example, in this embodiment, electric mining machine 100 includes a first set of wheels 122 located on second body portion 118 associated with the frontward portion of electric mining machine 100. First set of wheels 122 are connected to a front axle 124 that is powered by a front electric motor. In this embodiment, electric mining machine 100 also includes a second set of wheels 126 located on first body portion 116 associated with the rearward portion of electric mining machine 100. Second set of wheels 126 are connected to a rear axle 128 that is powered by a rear electric motor.

In an example embodiment, each set of wheels (e.g., first set of wheels 122 and second set of wheels 126) may comprise a pair of wheels on each side of electric mining machine 100 (i.e., one wheel per side). In other embodiments, additional wheels may be provided on one or both axles. For example, in some cases, one or both of front axle 124 or rear axle 128 may include two wheels on each side of electric mining machine 100.

In one embodiment, front axle 124 and rear axle 128 are not mechanically linked. In other words, each axle may be independently powered by its associated electric motor. In this manner, first set of wheels 122 on front axle 124 and second set of wheels 126 on rear axle 128 can be driven at different speeds and/or provided with different amounts of power.

In some embodiments, electric mining machine 100 may include additional components, including various standard vehicular provisions and accessories. For example, as shown in FIG. 1, electric mining machine 100 includes a cab 130 for receiving one or more operators of electric mining machine 100. Additionally, in this embodiment, electric mining machine 100 includes an auxiliary battery pack 132 disposed on second body portion 118 of chassis 102. Auxiliary battery pack 132 is provided separately from the battery packs included in removable power source 104 (e.g., first battery pack 108 and second battery pack 110) and is configured to provide auxiliary electric power to electric mining machine 100, such as during replacement of removable power source 104, as described in more detail below.

In an example embodiment, removable power source 104 is exposed on an exterior of electric mining machine 100. Specifically, various exterior surfaces of the housing (i.e., battery frame 106) that contains first battery pack 108 and second battery pack 110 may comprise part of the exterior of electric mining machine 100. In contrast, auxiliary battery pack 132 is an internal battery and is retained within chassis 102 of electric mining machine 100.

In some embodiments, auxiliary battery pack 132 may be "fixedly attached" to electric mining machine 100. That is, auxiliary battery pack 132 may not be separated from electric mining machine 100 without requiring part of electric mining machine 100 to be disassembled and/or without destroying one or more parts.

Figure 2:
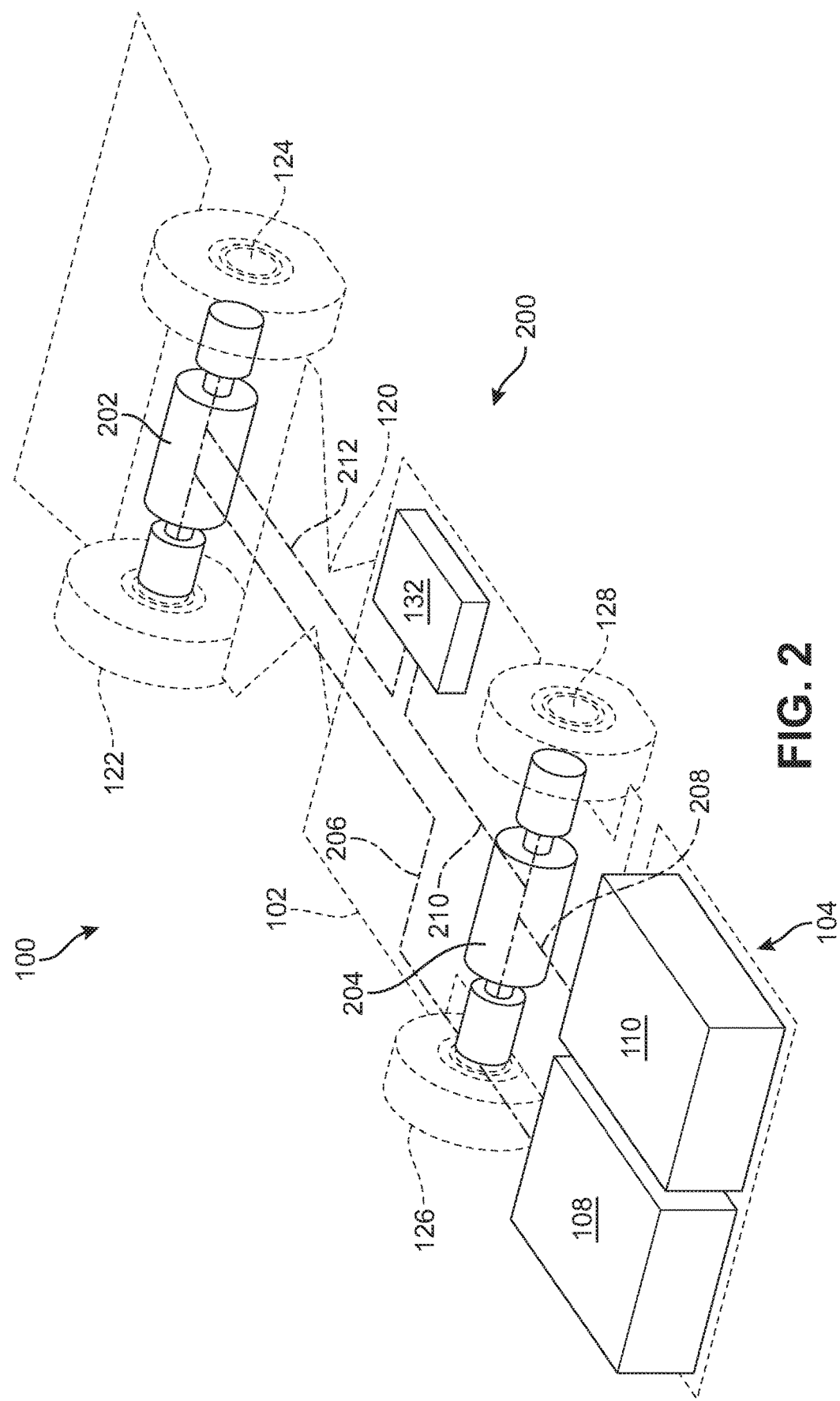
FIG. 2 is an outline view of the example embodiment of an electric mining machine illustrating components of an electric power control system.

Referring now to FIG. 2, an outline view of electric mining machine 100 is shown to illustrate the components of an electric power control system 200. In some embodiments, each battery pack of removable power source 104 (i.e., first battery pack 108 and second battery pack 110) may supply electric power a different electric motor (and accordingly, a different set of wheels). In some cases, each battery pack may power an electric motor on a particular axle (e.g., front axle 124 or rear axle 128). For example, in this embodiment, first battery pack 108 supplies electric power to a front electric motor 202 to drive front axle 124 and, thereby, first set of wheels 122 of electric mining machine 100. Similarly, second battery pack 110 supplies electric power to a rear electric motor 204 to drive rear axle 128, and, thereby, second set of wheels 126.

In one embodiment, as shown in FIG. 2, first battery pack 108 may be connected via a power cable 206 to provide power to components on front axle 124, including front electric motor 202. Likewise, second battery pack 110 may be connected via a power cable 208 to provide power to components on rear axle 128, including rear electric motor 204.

By powering the front and rear axles using separate battery packs (e.g., first battery pack 108 powering front axle 124 and second battery pack 110 powering rear axle 128), the amount of power to be delivered to a single source is reduced. This may allow for the use of smaller power cables (or cables with a lower current rating) that are easier to manage and/or less likely to fail.

Figure 7:
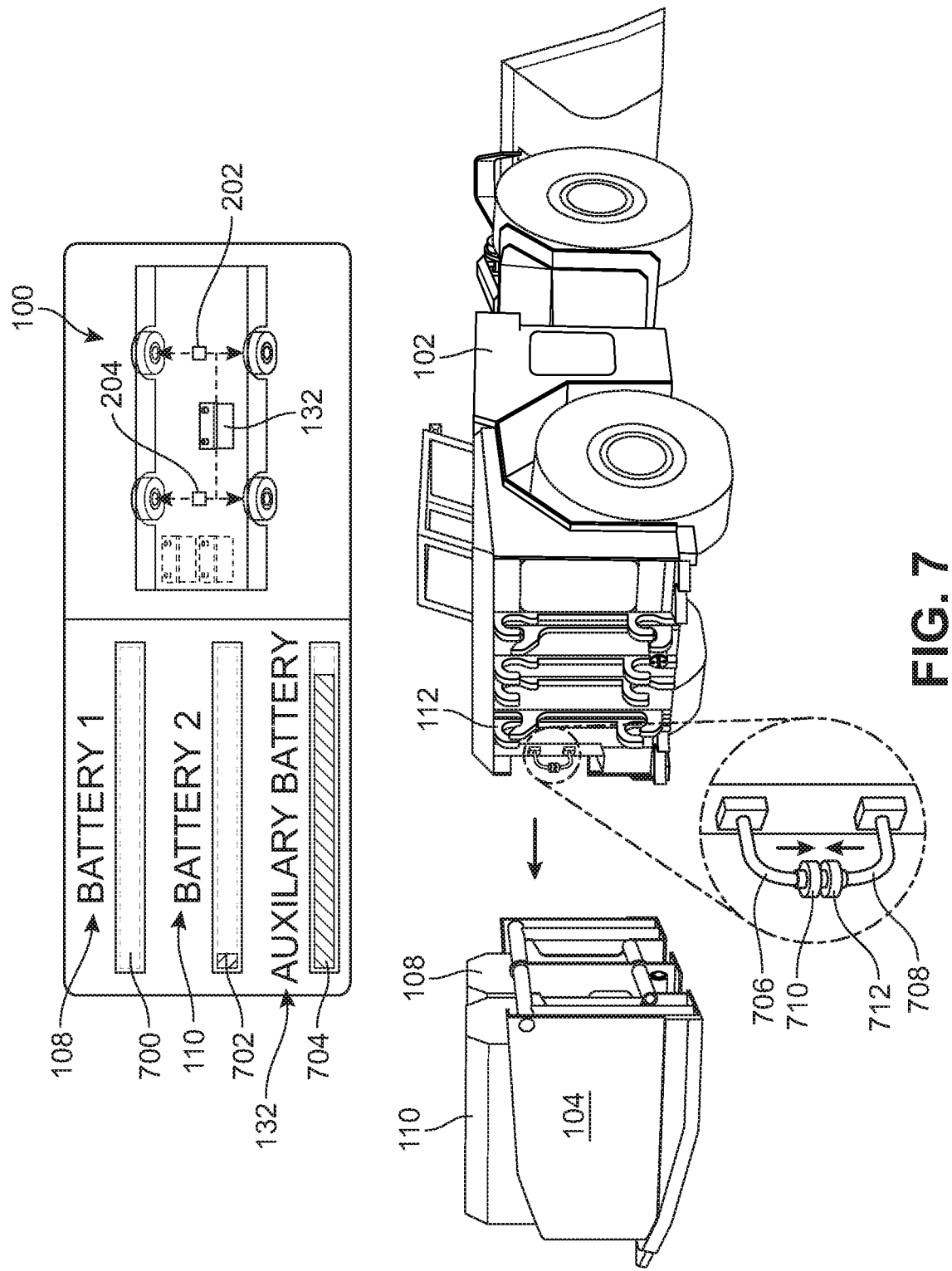
FIG. 7 is a representative view of an example embodiment of a process for replacing a battery pack of an electric mining machine.

Additionally, in some embodiments, electric power control system 200 may include additional components. For example, as described above, auxiliary battery pack 132 may be provided on the main body (e.g., chassis 102) of electric mining machine 100. Auxiliary battery pack 132 is connected via a power cable 210 to rear electric motor 204 and/or is connected via a power cable 212 to front electric motor 202. In some embodiments, auxiliary battery pack 132 may only be connected to one electric motor via power cable 210 or power cable 212. In these embodiments, a coupler may be used to connect auxiliary battery pack 132 to both electric motors so that power may be provided to both front axle 124 and rear axle 128, for example, as shown in FIG. 7 below.

Figure 3:
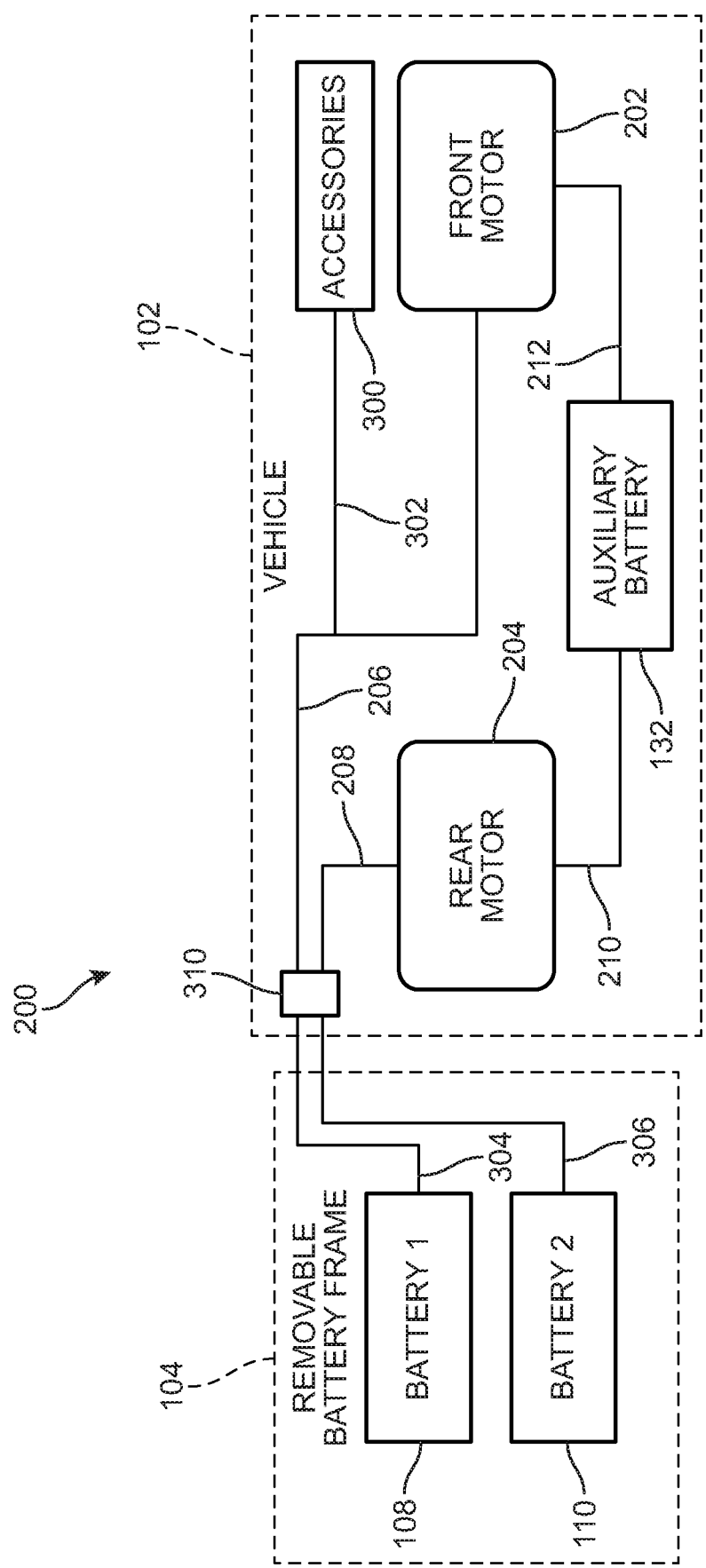
FIG. 3 is a schematic view of the components of the electric power control system of an electric mining machine.

Referring now to FIG. 3, a schematic view of the components of electric power control system 200 of electric mining machine 100 are illustrated. In this embodiment, electric power control system 200 of electric mining machine 100 includes the components described with reference to FIG. 2. Additionally, as described above, in some embodiments, electric mining machine 100 may include other components. For example, as shown in FIG. 3, electric mining machine 100 includes one or more accessories 300. Accessories 300 may include various components provided on electric mining machine 100 that draw electric power from electric power control system 200. For example, accessories 300 can be lights, radios, heating and/or cooling appliances, power takeoff units, or other components that connect and use electric power from electric power control system 200.

In this embodiment, accessories 300 are supplied electric power from first battery pack 108 via a power cable 302. Thus, in some embodiments, first battery pack 108 supplies electric power not only to front electric motor 202 to drive front axle 124, but also to accessories 300. As a result, in these embodiments, first battery pack 108 may experience higher loads or discharging rates than second battery pack 110, which only supplies electric power to rear electric motor 204 to drive rear axle 128. In other embodiments, accessories 300 may be supplied electric power from second battery pack 110 instead of first battery pack 108.

Accordingly, the electric power distribution system and method according to the techniques of the embodiments described herein distributes power between the individual electric motors (e.g., front electric motor 202 and rear electric motor 204) in order to equalize the amount of charge of remaining between the two main battery packs (e.g., first battery pack 108 and second battery pack 110). With this arrangement, the unequal load and/or discharge rates between first battery pack 108 and second battery pack 110 may be compensated for to better distribute the electric power load and/or discharge rates.

In an example embodiment, electric power control system 200 of electric mining machine 100 may include a power system controller 310 that is in communication with the components of electric power control system 200. For example, in this embodiment, power system controller 310 is in communication with at least first battery pack 108, front electric motor 202, second battery pack 110, and rear electric motor 204. In some cases, one or more power cables may include communication capabilities, such as power cables 206, 208, 210, 212, described above. In other embodiments, separate communication cables may be provided between the components of electric power control system 200 to communicate with power system controller 310.

Additionally, in this embodiment, each battery pack in removable power source 104 (e.g., first battery pack 108 and second battery pack 110) provides electric power to the components of electric power control system 200 of electric mining machine 100 via a connection with power system controller 310. For example, as shown in FIG. 3, first battery pack 108 is connected to power system controller 310 and electric power control system 200 via a power cable 304. Similarly, second battery pack 110 is connected to power system controller 310 and electric power control system 200 via a power cable 306.

Once each battery pack is connected to power system controller 310, the battery pack may supply electric power to its associated components. For example, first battery pack 108 supplies electric power to front electric motor 202 and accessories 300 via power cable 304, power cable 206, and power cable 302. Second battery pack 110 supplies electric power to rear electric motor 204 via power cable 306 and power cable 208. In this embodiment, the power cables that extend between the battery packs in removable power source 104 and chassis 102 of electric mining machine 100 are configured to be removably connected to expedite replacement of removable power source 104. Accordingly, power cable 304 and power cable 306 are configured to removably engage and disengage with connectors associated with power system controller 310 on the main body of electric mining machine 100 to electrically couple and uncouple removable power source 104 with electric power control system 200.

In an example embodiment, power system controller 310 may be configured to implement the techniques for electric power distribution described herein. For example, power system controller 310 may include a computer or processor that is configured to execute instructions for implementing the method for electric power distribution according to the example embodiments.

Figure 4:
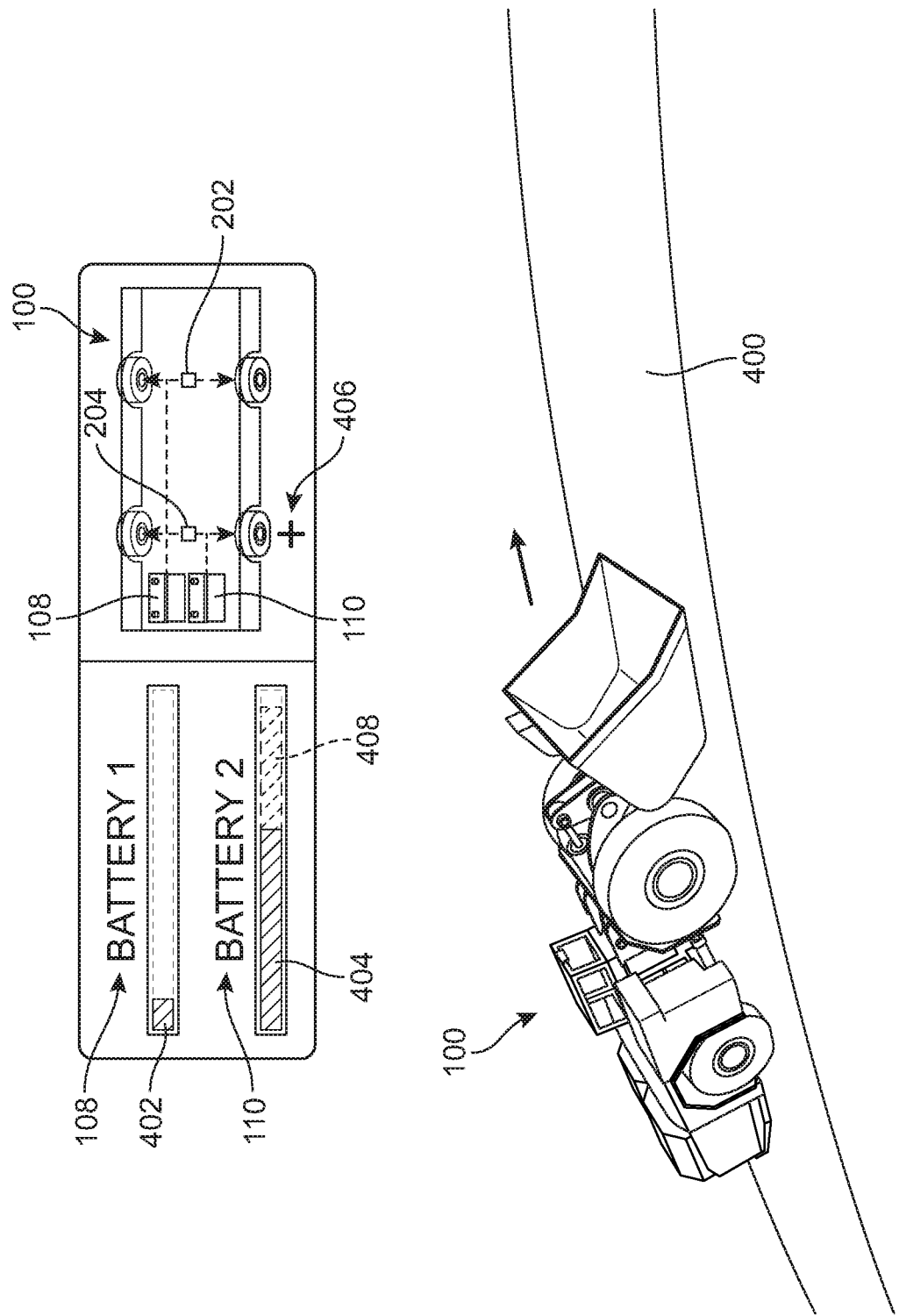
FIG. 4 is a representative view of an example embodiment of electric power distribution in the electric mining machine under load.
Figure 5:
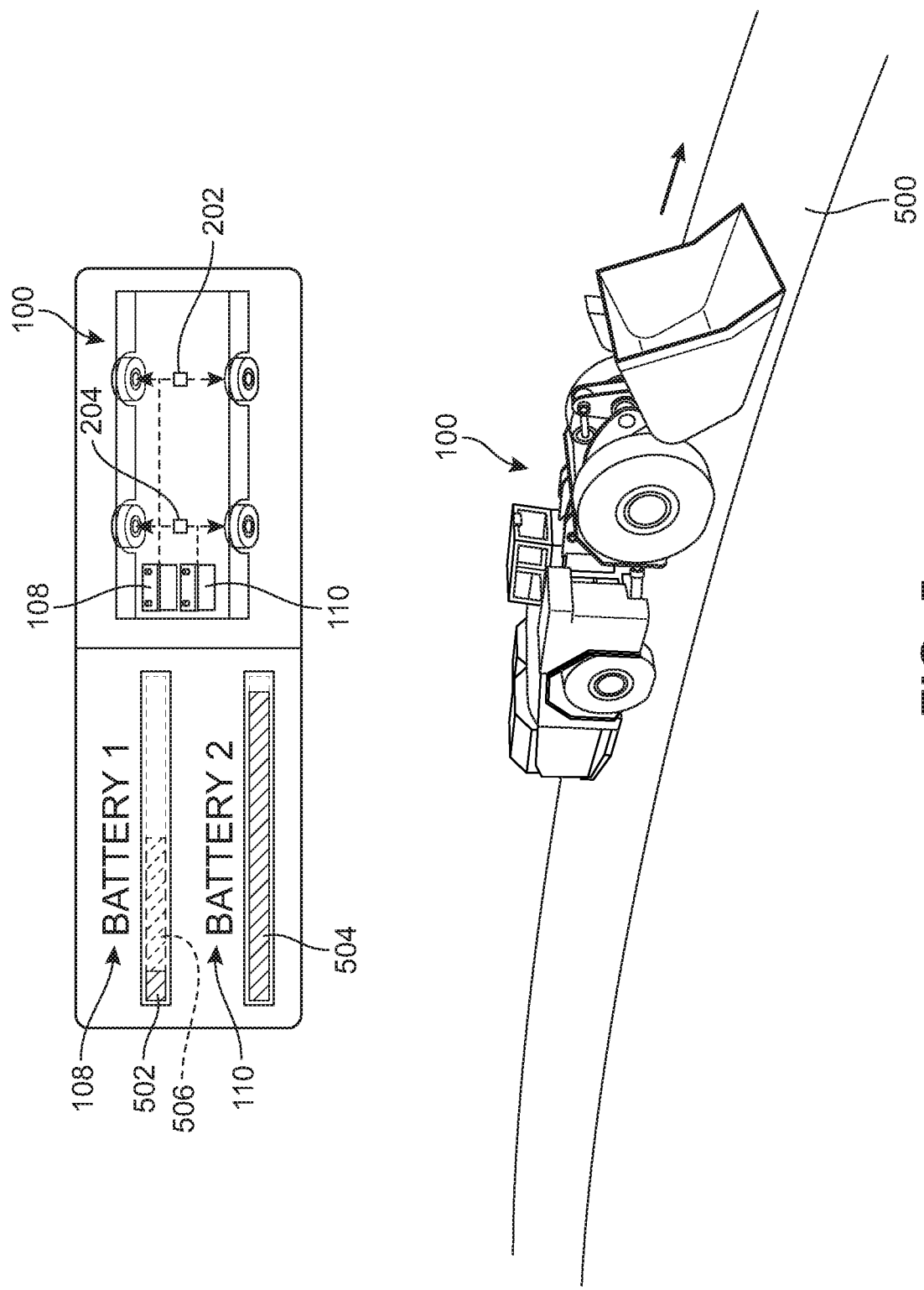
FIG. 5 is a representative view of an example embodiment of electric power distribution in the electric mining machine during regenerative braking.

Referring now to FIGS. 4 and 5, example scenarios of electric power distribution for electric mining machine 100 according to the techniques of the present embodiments are illustrated. FIG. 4 is a representative view of an example embodiment of electric power distribution in electric mining machine 100 under load. As shown in FIG. 4, electric mining machine 100 is under load, for example, hauling material and/or climbing an inclined surface 400. During load, the electric power supplied to the electric motors (e.g., front electric motor 202 and rear electric motor 204) will generally need to be increased to accommodate the load.

In this embodiment, first battery pack 108 that supplies electric power to front electric motor 202 for driving front axle 124 of electric mining machine 100 has a low state of charge 402. For example, as shown in FIG. 4, state of charge 402 of first battery pack 108 indicates that first battery pack 108 has approximately 10% or less of its charge capacity remaining. Meanwhile, second battery pack 110 that supplies electric power to rear electric motor 204 for driving rear axle 128 of electric mining machine 100 has a higher state of charge 404. For example, as shown in FIG. 4, state of charge 404 of second battery pack 110 indicates that second battery pack 110 has approximately 80% or more of its charge capacity remaining.

This disparity in the state of charge between the two battery packs (i.e., between the low state of charge 402 of first battery pack 108 and the higher state of charge 404 of second battery pack 110) may be caused by various factors. For example, as described above, in some embodiments, first battery pack 108 may also supply electric power to accessories 300 and may experience a greater discharge rate than second battery pack 110. In other embodiments, first battery pack 108 may be less efficient, may have one or more malfunctioning battery cells, or may have experienced other conditions that caused it to become depleted. Regardless of the cause of the disparity in state of charge, the techniques described herein provide a mechanism to equalize the amount of charge of remaining between the two main battery packs (e.g., first battery pack 108 and second battery pack 110).

As shown in FIG. 4, while electric mining machine 100 is under load, for example, climbing inclined surface 400 and/or hauling material, the electric power distribution method of the present embodiments is configured to increase electric power 406 to rear electric motor 204 of electric mining machine 100. The increased electric power 406 delivered to rear electric motor 204 provides greater driving force to rear axle 128 and, thereby, to second set of wheels 126. The increase in electric power 406 to rear electric motor 204 causes second battery pack 110 to supply a corresponding greater amount of electric power, causing second battery pack 110 to discharge an amount of charge 408 from higher state of charge 404.

Meanwhile, because electric mining machine 100 under load is being driven primarily by rear electric motor 204 moving second set of wheels 126 on rear axle 128, first battery pack 108 may supply less or no power to front electric motor 202 to move first set of wheels 122 on front axle 124. With this arrangement, second battery pack 110 provides increased power to rear electric motor 204 and is discharged by a greater amount (i.e., amount of charge 408) than first battery pack 108 to compensate for the charge disparity between the two battery packs (i.e., between the low state of charge 402 of first battery pack 108 and the initially higher state of charge 404 of second battery pack 110). Thus, under these conditions, the electric power distribution system and method of the present embodiments distributes power between the individual electric motors in order to attempt to equalize the amount of charge of remaining between the two main battery packs.

Additionally, under the scenario described with reference to FIG. 4, first battery pack 108 had a lower state of charge than second battery pack 110. However, it should be understood that in the case where second battery pack 110 had a lower state of charge than first battery pack 108, increased electric power could have been supplied to front electric motor 202 in a similar manner to discharge a greater amount of charge from first battery pack 108, thereby, attempting to equalize the amount of charge of remaining between the two main battery packs.

FIG. 5 is a representative view of an example embodiment of electric power distribution in electric mining machine 100 during regenerative braking. As shown in FIG. 5, electric mining machine 100 is undergoing regenerative braking, for example, while descending a sloped surface 500. During regenerative braking, a vehicle's kinetic energy is converted into electricity that can be stored in the vehicle's battery packs. For example, in the case of electric mining machine 100, the electric motors (e.g., front electric motor 202 and/or rear electric motor 204) may be used to provide resistance to the corresponding axles (e.g., front axle 124 and/or rear axle 128), to reduce the rotational speed of the associated sets of wheels (e.g., first set of wheels 122 and/or second set of wheels 126) and thereby slow down electric mining machine 100. During this regenerative braking process, the accumulated electricity generated via the resistance from the electric motors may be used to recharge the battery packs (e.g., first battery pack 108 and second battery pack 110). Additionally, in some embodiments, conventional brakes may also be used to provide supplemental or assistive braking force to regenerative braking.

In this embodiment, first battery pack 108 that supplies electric power to front electric motor 202 for driving front axle 124 of electric mining machine 100 has a low state of charge 502. For example, as shown in FIG. 5, state of charge 502 of first battery pack 108 indicates that first battery pack 108 has approximately 10% or less of its charge capacity remaining. Meanwhile, second battery pack 110 that supplies electric power to rear electric motor 204 for driving rear axle 128 of electric mining machine 100 has a higher state of charge 504. For example, as shown in FIG. 5, state of charge 504 of second battery pack 110 indicates that second battery pack 110 has approximately 80% or more of its charge capacity remaining.

As described above, this disparity in the state of charge between the two battery packs (i.e., between the low state of charge 502 of first battery pack 108 and the higher state of charge 504 of second battery pack 110) may be caused by various factors. For example, as described above, in some embodiments, first battery pack 108 may also supply electric power to accessories 300 and may experience a greater discharge rate than second battery pack 110. In other embodiments, first battery pack 108 may be less efficient, may have one or more malfunctioning battery cells, or may have experienced other conditions that caused it to become depleted. Regardless of the cause of the disparity in state of charge, the techniques described herein provide a mechanism to equalize the amount of charge of remaining between the two main battery packs (e.g., first battery pack 108 and second battery pack 110).

As shown in FIG. 5, while electric mining machine 100 is regenerative braking, for example, descending sloped surface 500, the electric power distribution method of the present embodiments is configured to charge first battery pack 108 of electric mining machine 100. The electricity generated during the regenerative braking process (e.g., from the resistance by front electric motor 202 and/or rear electric motor 204) can be provided to electric power control system 200 of electric mining machine 100 and diverted or sent to first battery pack 108. For example, power system controller 310 may channel the electricity generated during regenerative braking to first battery pack 108 via power cable 304.

This electricity delivered to first battery pack 108 during regenerative braking causes first battery pack 108 to increase its amount of charge from the low state of charge 502 to a higher amount of charge 506. For example, as shown in FIG. 5, state of charge 506 of first battery pack 108 indicates that first battery pack 108 has increased its charge from approximately 10% or less to 50% or more of its charge capacity remaining. With this arrangement, electricity from regenerative braking provides increased charging to first battery pack 108 to compensate for the charge disparity between the two battery packs (i.e., between the initially low state of charge 502 of first battery pack 108 and the higher state of charge 504 of second battery pack 110). Thus, under these conditions, the electric power distribution system and method of the present embodiments distributes charging in order to attempt to equalize the amount of charge of remaining between the two main battery packs.

Additionally, under the scenario described with reference to FIG. 5, first battery pack 108 had a lower state of charge than second battery pack 110. However, it should be understood that in the case where second battery pack 110 had a lower state of charge than first battery pack 108, electricity generated during regenerative braking could have been supplied to second battery pack 110 in a similar manner to increase the amount of charge of second battery pack 110, thereby, attempting to equalize the amount of charge of remaining between the two main battery packs.

Figure 6:
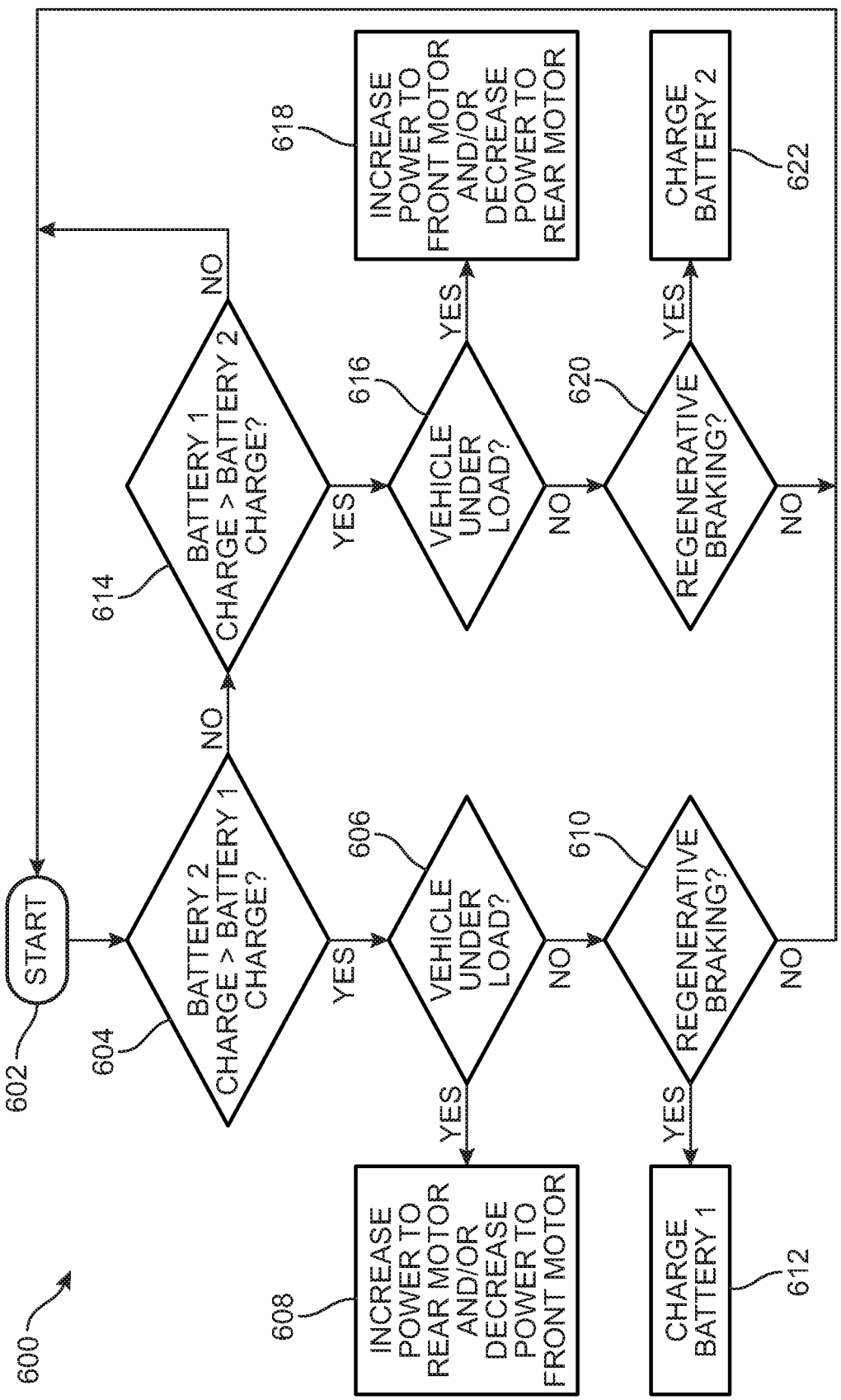
FIG. 6 is a flowchart of an example embodiment of a method for electric power distribution in an electric mining machine.

FIG. 6 is a flowchart of an example embodiment of a method 600 for electric power distribution in an electric mining machine. In some embodiments, method 600 may be implemented in electric mining machine 100. In other embodiments, method 600 may be implemented in other electric mining machines and/or electric vehicles. In an example embodiment, method 600 may be implemented by power system controller 310 of electric mining machine 100.

In this embodiment, method 600 begins at a start operation 602. In some embodiments, start operation 602 may be automatically initiated upon detection of a load applied to the electric mining machine or regenerative braking being implemented. In other embodiments, start operation 602 may be manually initiated by an operator of the electric mining machine.

In some embodiments, start operation 602 may include receiving state of charge information associated with the two main battery packs of the electric mining machine. For example, start operation 602 may include receiving information associated with a state of charge of a first battery pack that supplies electric power to a front electric motor configured to drive a front axle of the electric mining vehicle and receiving information associated with a state of charge of a second battery pack that supplies electric power to a rear electric motor configured to drive a rear axle of the electric mining vehicle.

After start operation 602, method 600 proceeds to an operation 604 where the state of charge of the two main battery packs are compared. For example, at operation 604, a state of charge of the second battery pack (e.g., second battery pack 110) that supplies electric power to the rear electric motor configured to drive the rear axle of the electric mining vehicle is compared to a state of charge of the first battery pack (e.g., first battery pack 108) that supplies electric power to the front electric motor configured to drive the front axle of the electric mining vehicle. Operation 604 determines whether or not the state of charge of the second battery pack is greater than the state of charge of the first battery pack.

Upon determining at operation 604 that the state of charge of the second battery pack is greater than the state of charge of the first battery pack, method 600 proceeds to an operation 606. At operation 606, whether or not the vehicle (e.g., electric mining machine 100) is under load, such as hauling material and/or traveling up an inclined surface, is determined. For example, as described with reference to the scenario illustrated in FIG. 4 above.

Upon determining at operation 606 that the vehicle is under load, then method 600 proceeds to an operation 608. At operation 608, power is increased to the rear electric motor (e.g., the electric motor supplied with electric power from the second battery pack with a greater state of charge). Additionally, in some embodiments, at operation 608, power may also or alternatively be decreased to the front electric motor (e.g., the electric motor supplied with electric power from the first battery pack with a lower state of charge).

Accordingly, because of the increase in power to the rear electric motor (and/or the decrease in power to the front electric motor), more charge is depleted from the second battery pack (e.g., second battery pack 110) than the first battery pack (e.g., first battery pack 108). With this arrangement, method 600 may be used to equalize the amount of charge of remaining between the two main battery packs (e.g., first battery pack 108 and second battery pack 110).

Returning to operation 606, upon determining that the vehicle (e.g., electric mining machine 100) is not under load, method 600 instead proceeds to an operation 610. At operation 610, whether or not the vehicle (e.g., electric mining machine 100) is undergoing regenerative braking is determined. For example, as described with reference to the scenario illustrated in FIG. 5 above.

Upon determining at operation 610 that the vehicle is undergoing or implementing regenerative braking, then method 600 proceeds to an operation 612. At operation 612, the recovered electricity generated by the regenerative braking process is used to charge the first battery pack (e.g., the battery pack having the lower state of charge). Upon determining at operation 610, that the vehicle is not regenerative braking, then method 600 proceeds back to start operation 602 until it is implemented again.

Returning to operation 604, upon determining that the state of charge of the second battery pack is not greater than the state of charge of the first battery pack, method 600 proceeds to an operation 614. Operation 614 determines whether or not the state of charge of the first battery pack is greater than the state of charge of the second battery pack. Upon determining at operation 614 that the state of charge of the first battery pack is not greater than the state of charge of the second battery pack, method 600 proceeds back to start operation 602 until it is implemented again. In other words, there is no charge disparity between the two battery packs that needs to be equalized at this time.

Upon determining at operation 614 that the state of charge of the first battery pack is greater than the state of charge of the second battery pack, method 600 proceeds to an operation 616. At operation 616, whether or not the vehicle (e.g., electric mining machine 100) is under load, such as hauling material and/or traveling up an inclined surface, is determined. For example, as described with reference to the scenario illustrated in FIG. 4 above.

Upon determining at operation 616 that the vehicle is under load, then method 600 proceeds to an operation 618. At operation 618, power is increased to the front electric motor (e.g., the electric motor supplied with electric power from the first battery pack with a greater state of charge). Additionally, in some embodiments, at operation 618, power may also or alternatively be decreased to the rear electric motor (e.g., the electric motor supplied with electric power from the second battery pack with a lower state of charge).

Accordingly, because of the increase in power to the front electric motor (and/or the decrease in power to the rear electric motor), more charge is depleted from the first battery pack (e.g., first battery pack 108) than the second battery pack (e.g., second battery pack 110). With this arrangement, method 600 may be used to equalize the amount of charge of remaining between the two main battery packs (e.g., first battery pack 108 and second battery pack 110).

Returning to operation 616, upon determining that the vehicle (e.g., electric mining machine 100) is not under load, method 600 instead proceeds to an operation 620. At operation 620, whether or not the vehicle (e.g., electric mining machine 100) is undergoing regenerative braking is determined. For example, as described with reference to the scenario illustrated in FIG. 5 above.

Upon determining at operation 620 that the vehicle is undergoing or implementing regenerative braking, then method 600 proceeds to an operation 622. At operation 622, the recovered electricity generated by the regenerative braking process is used to charge the second battery pack (e.g., the battery pack having the lower state of charge). Upon determining at operation 620, that the vehicle is not regenerative braking, then method 600 proceeds back to start operation 602 until it is implemented again.

With this arrangement, method 600 for electric power distribution may be used to equalize the amount of charge of remaining between the two main battery packs (e.g., first battery pack 108 and second battery pack 110) of an electric mining machine (e.g., electric mining machine 100).

In some embodiments, an electric mining machine may include an auxiliary battery pack to facilitate replacement of a removable power source. In these embodiments, the auxiliary battery pack is configured to supply electric power to the rear electric motor and the front electric motor of the electric mining machine during replacement of a battery pack. For example, as shown in FIGS. 1-3 above, electric mining machine 100 includes auxiliary battery pack 132 that supplies electric power to rear electric motor 204 and/or front electric motor 202 during replacement of removable power source 104 including first battery pack and second battery pack 110.

Figure 8:
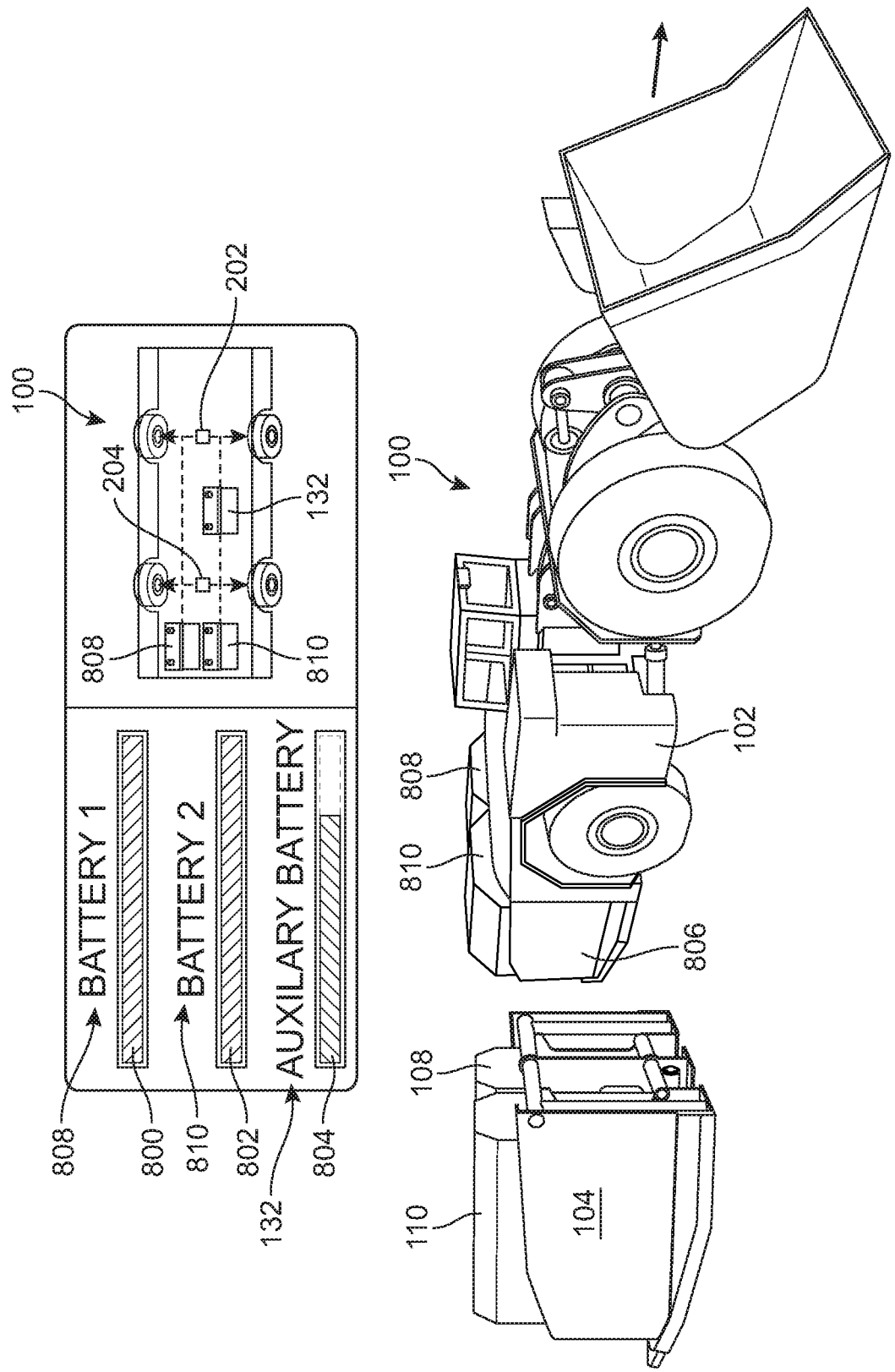
FIG. 8 is a representative view of an example embodiment of an electric mining machine with a replacement battery pack.

Referring now to FIGS. 7 and 8, representative views of an example embodiment of a process for replacing a battery pack of an electric mining machine is illustrated. As shown in FIG. 7, when one or both of the main battery packs of electric mining machine 100 have been depleted or have reached a minimum threshold of remaining charge, removable power source 104 may be replaced with another removable power source that has charged battery packs. For example, as shown in FIG. 7, first battery pack 108 has been depleted as indicated by a state of charge 700 that shows little or no charge remaining. Similarly, second battery pack 110 has also been substantially depleted as indicated by a state of charge 702 that shows a small amount of remaining charge. In this embodiment, small amount of remaining charge indicated by state of charge 702 of second battery pack 110 may be below a minimum threshold, for example, less than 5% capacity remaining.

In this embodiment, therefore, removable power source 104 containing first battery pack 108 and second battery pack 110 may be replaced to provide electric mining machine with another removable power source that has charged battery packs. In an example embodiment, electric mining machine 100 includes auxiliary battery pack 132 that is configured to supply electric power to rear electric motor 204 and/or front electric motor 202 during replacement of removable power source 104. In this embodiment, removable power source 104 has been uncoupled from the main body or chassis 102 of electric mining machine 100. For example, removable power source 104 may be uncoupled from chassis 102 via release of attachment mechanism 112.

While removable power source 104 is uncoupled from electric mining machine 100, auxiliary battery pack 132 provides electric power to at least one of rear electric motor 204 or front electric motor 202. As shown in FIG. 7, auxiliary battery pack 132 has a state of charge 704 that indicates that auxiliary battery pack 132 has a substantial amount of charge remaining, for example, approximately 90% or more of its charge capacity remaining. Therefore, auxiliary battery pack 132 may be used to supply electric power to rear electric motor 204 and/or front electric motor 202 to move and/or position electric mining machine 100 to receive the replacement removable power source containing charged battery packs.

In an example embodiment, a power cable extends between the main body or chassis 102 of electric mining machine 100 to each of the main battery packs (e.g., first battery pack 108 and second battery pack 110) to electrically connect the electric motors to the corresponding battery pack supplying electric power to the respective motor. For example, as shown in FIG. 7, a first power cable 706 is configured to couple to first battery pack 108 and a second power cable 708 is configured to couple to second battery pack 110. During the process of replacing removable power source 104, first power cable 706 is uncoupled from first battery pack 108 and second power cable 708 is uncoupled from second battery pack 110.

In some embodiments, auxiliary battery pack 132 may be electrically connected only to one of rear electric motor 204 or front electric motor 202. In these embodiments, a coupler may be used to electrically connect both electrical systems for rear electric motor 204 and front electric motor 202 together so that both motors may be supplied electric power from auxiliary battery 132. For example, a coupler may be used to couple an end 710 of first power cable 706 associated with front electric motor 202 to an end 712 of second power cable 708 associated with rear electric motor 204 so that auxiliary battery pack 132 is connected to both motors.

In other embodiments, a switch or other device may be included in electric power control system 200, for example, as part of, or controlled by, power system controller 310 to couple auxiliary battery pack 132 with rear electric motor 204 and front electric motor 202. In such embodiments, coupling may be accomplished automatically, for example, upon release of removable power source 104, or manually, for example, upon initiation by an operator of electric mining machine 100.

As shown in FIG. 8, electric mining machine 100 has been provided with another removable power source 806 that includes replacement battery packs, including a replacement first battery pack 808 (configured to supply electric power to front electric motor 202) and a replacement second battery pack 810 (configured to supply electric power to rear electric motor 204). Removable power source 806 has a substantially similar arrangement as removable power source 104, described above, including a battery frame that is configured to support and hold replacement first battery pack 808 and replacement second battery pack 810. Additionally, removable power source 806 has a similar attachment mechanism that allows it to couple and uncouple with the main body or chassis 102 of electric mining machine 100, for example, via attachment mechanism 112.

With this arrangement, once removable power source 806 is coupled to electric power control system 200, replacement first battery pack 808 may supply electric power to front electric motor 202 and replacement second battery pack 810 may supply electric power to rear electric motor 204. As shown in FIG. 8, replacement first battery pack 808 has a state of charge 800 that indicates that replacement first battery pack 808 is fully charged (i.e., approximately 100% of its charge capacity remaining) and replacement second battery pack 810 has a state of charge 802 that indicates that replacement second battery pack 810 is also fully charged (i.e., approximately 100% of its charge capacity remaining).

In contrast, auxiliary battery pack 132 has a state of charge 804 that indicates that auxiliary battery pack 132 has lesser amount of charge remaining compared to its previous state of charge 704 prior to its use during the battery pack replacement process. Thus, auxiliary battery pack 132 may provide sufficient electric power to rear electric motor 204 and/or front electric motor 202 to move and/or position electric mining machine 100 to receive the replacement removable power source 806 containing charged battery packs (e.g., replacement first battery pack 808 and replacement second battery pack 810). In this manner, auxiliary battery pack 132 facilitates replacement of a removable power source of electric mining machine 100. With this arrangement, fully charged replacement battery packs can be quickly and easily provided to electric mining machine 100 in order to eliminate or reduce downtime of electric mining machine 100.

Additionally, in some embodiments, once replacement removable power source 806 is attached to electric mining machine 100, replacement first battery pack 808 and/or replacement second battery pack 810 may be used to recharge auxiliary battery pack 132.

The present embodiments for electric power distribution have been described in reference to an electric mining machine having two axles, with each axle being driven by a separate electric motor that is supplied electric power from an associated battery pack. It should be understood that the principles of the techniques described herein may also be applied to electric mining machines and/or electric vehicles having additional numbers of powered axles. For example, the techniques described herein also apply to an electric mining machine and/or electric vehicle having three axles, with each axle being driven by a separate electric motor that is supplied electric power from an associated battery pack. In such embodiments, the electric power distribution system and method of the example embodiments may be used to equalize the state of charge between three battery packs in a similar manner as described above in reference to two battery packs. Similarly, other embodiments having any number of separately powered axles may also use the techniques described herein for electric power distribution.

While this disclosure mainly describes onboard, removable batteries, such as the replacement power source and/or battery packs described above, it will be understood that variations on the energy sources are possible within the scope of this concept. That is the interchangeable energy device may be a battery, a different type of battery, a generator, a fuel engine, or an adaptor for any existing energy infrastructure. It will also be understood that the system may be employed with any combination of devices, such as batteries, adapters and the like. It will also be understood that the energy source is compatible with and in communication with the drive system and drive controller. The energy source, whether battery or trolley adapter, or another type of source would be compatible with the drive system and controller. As described herein, the OCS, overhead catenary system or rail may involve options for off-wire operation such as ground level power supply or on-board energy storage systems. While on-board power generation is a third option that has received less research, this may change with hydrogen fuel cell technology. Any combination of energy systems are also contemplated to within the scope of this disclosure. Ground level power supply can be contact or contactless. Contact ground level power supply essentially employs an embedded third rail as is typically used in subway systems and was used on some early streetcar systems. Much improved versions of this technology may offer advantages in challenging environments that have heavy loads from heating or cooling needs or the need to traverse steep inclines, all of which can quickly drain a stored power system.

Another type of infrastructure which may pre-exist is contactless ground level power supply using induction coils to power the vehicle. Typically this power transfer takes place only when the vehicle is directly above the coils, and the range of such a system may be extended by combining it with an on-board power storage, so that the coils do not need to be present along the entire length of the system. On-board energy storage offers an alternative or complement to ground level power supply. Storage mechanisms include batteries, capacitors, flywheels and in some cases, reclaiming kinetic energy from braking to increase system efficiency. A system that runs off wire for a limited segment can often recharge onboard power as runs on a wired segment. Longer spans of off wire operation may require a recharging station approach, which be attained by sufficient dwell time at a stop. For example, in some streetcar systems, a programed dwell time of contact at a station is sufficient to recharge the roof-mounted supercapacitors, charging in a short amount of time that is customary for its duty cycle.

In general, as used herein, "electric vehicle" refers to a vehicle that uses electrical power for propulsion purposes, at least in one mode of operation. Thus, electric vehicles include all-electric vehicles (e.g., a vehicle with a traction motor and only an onboard electrical energy storage device or mechanism for receiving electric energy from an off-board source, such as an overhead catenary or powered rail), hybrid-electric vehicles (e.g., a vehicle with a traction motor, an energy storage device, hydraulic propulsion, and a fuel engine, fuel cell, or the like for charging the energy storage device and/or directly generating power for running the traction motor), dual-mode vehicles (e.g., a vehicle with an engine-only mode of operation and an electricity-only mode of operation, or a vehicle with a first mode of operation where traction electricity is provided by an engine and a second mode of operation where traction electricity is provided by another source), diesel-electric and other engine-electric vehicles (e.g., a vehicle with an engine that generates electrical power for running a traction motor), and combinations and variants thereof. Electric vehicles may have one traction motor, or plural traction motors; "traction motor" refers to a motor of sufficient size and capacity to move a vehicle of sufficient size for the designated operation.

Also, the vehicle interface equipment of the wayside stations may comprise "plug in" modules, e.g., the vehicle plugs into a receptacle of the wayside station, for receiving electrical power from the station; a continuous power interface by which a vehicle can receive off-board power while moving, such as the aforementioned catenary line or third rail; or the like.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for electric power distribution in an electric mining machine, the method comprising:
receiving information associated with a state of charge of a first battery pack, wherein the first battery pack supplies electric power to a front electric motor configured to drive a front axle of an electric mining machine;
receiving information associated with a state of charge of a second battery pack, wherein the second battery pack supplies electric power to a rear electric motor configured to drive a rear axle of the electric mining machine;
comparing the state of charge of the first battery pack to the state of charge of the second battery pack; and
upon determining that (1) the electric mining machine is under load, and (2) the state of charge of the second battery pack is greater than the state of charge of the first battery pack, increasing electric power to the rear electric motor of the electric mining machine to accommodate the load, wherein the load is associated with at least one of hauling material or climbing an inclined surface.

2. The method of claim 1, wherein upon determining that the state of charge of the second battery pack is greater than the state of charge of the first battery pack, the method further comprising decreasing electric power to the front electric motor of the electric mining machine.

3. The method of claim 1, further comprising:
upon determining that the state of charge of the first battery pack is greater than the state of charge of the second battery pack, increasing electric power to the front electric motor of the electric mining machine.

4. The method of claim 1, wherein upon determining that the state of charge of the second battery pack is greater than the state of charge of the first battery pack, the method further comprising charging the first battery pack during regenerative braking.

5. The method of claim 1, further comprising:
upon determining that the state of charge of the first battery pack is greater than the state of charge of the second battery pack, charging the second battery pack during regenerative braking.

6. The method of claim 1, wherein the front axle and the rear axle are not mechanically linked.

7. The method of claim 1, wherein the electric mining machine further comprises an auxiliary battery pack; and
wherein the auxiliary battery pack is configured to supply electric power to the rear electric motor and the front electric motor of the electric mining machine during replacement of a battery pack.

8. A power control system in an electric mining machine for providing electric power distribution, the power control system comprising:
a power system controller in communication with at least a first battery pack and a second battery pack of an electric mining machine;
the first battery pack configured to supply electric power to a front electric motor to drive a front axle of the electric mining machine;
the second battery pack configured to supply electric power to a rear electric motor to drive a rear axle of the electric mining machine; and wherein the power system controller is configured to:
compare a state of charge of the first battery pack to a state of charge of the second battery pack; and
upon determining that (1) the electric mining machine is under load, and (2) the state of charge of the second battery pack is greater than the state of charge of the first battery pack, increase electric power to the rear electric motor of the electric mining machine to accommodate the load, wherein the load is associated with at least one of hauling material or climbing an inclined surface.

9. The power control system of claim 8, wherein upon determining that the state of charge of the second battery pack is greater than the state of charge of the first battery pack, the power system controller is configured to decrease electric power to the front electric motor of the electric mining machine.

10. The power control system of claim 8, wherein the power system controller is further configured to:
upon determining that the state of charge of the first battery pack is greater than the state of charge of the second battery pack, increase electric power to the front electric motor of the electric mining machine.

11. The power control system of claim 8, wherein upon determining that the state of charge of the second battery pack is greater than the state of charge of the first battery pack, the power system controller is configured to charge the first battery pack during regenerative braking.

12. The power control system of claim 8, wherein the power system controller is further configured to:
upon determining that the state of charge of the first battery pack is greater than the state of charge of the second battery pack, charge the second battery pack during regenerative braking.

13. The power control system of claim 8, wherein the front axle and the rear axle are not mechanically linked.

14. The power control system of claim 8, wherein the electric mining machine further comprises an auxiliary battery pack; and
wherein the power system controller is configured to control the auxiliary battery pack to supply electric power to the rear electric motor and the front electric motor of the electric mining machine during replacement of a battery pack.

15. An electric mining machine comprising:
a front electric motor configured to drive a front axle of the electric mining machine;
a rear electric motor configured to drive a rear axle of the electric mining machine;
a first battery pack configured to supply electric power to the front electric motor; a second battery pack configured to supply electric power to the rear electric motor; and
a power system controller in communication with at least the first battery pack, the front electric motor, the second battery pack, and the rear electric motor, wherein the power system controller is configured to:
compare a state of charge of the first battery pack to a state of charge of the second battery pack; and
upon determining that (1) the electric mining machine is under load, and (2) the state of charge of the second battery pack is greater than the state of charge of the first battery pack, increase electric power to the rear electric motor of the electric mining machine to accommodate the load, wherein the load is associated with at least one of hauling material or climbing an inclined surface.

16. The electric mining machine of claim 15, wherein upon determining that the state of charge of the second battery pack is greater than the state of charge of the first battery pack, the power system controller is configured to decrease electric power to the front electric motor of the electric mining machine.

17. The electric mining machine of claim 15, wherein the power system controller is further configured to:
upon determining that the state of charge of the first battery pack is greater than the state of charge of the second battery pack, increase electric power to the front electric motor of the electric mining machine.

18. The electric mining machine of claim 15, wherein, during regenerative braking, the power system controller selects one of the first battery pack or the second battery pack for charging based on which of the first battery pack or the second battery pack has a lower state of charge.

19. The electric mining machine of claim 15, wherein the front axle and the rear axle are not mechanically linked.

20. The electric mining machine of claim 15, further comprising an auxiliary battery pack; and
wherein the power system controller is configured to control the auxiliary battery pack to supply electric power to the rear electric motor and the front electric motor of the electric mining machine during replacement of a battery pack.

* * * * *